Aug. 17, 1965 G. K. CLYMER 3,200,490

METHOD OF FORMING OHMIC BONDS TO A GERMANIUM-COATED SILICON BODY WITH EUTECTIC ALLOY FORMING MATERIALS

Filed Dec. 7, 1962

INVENTOR.
GERALD K. CLYMER
BY
Stanley Z. Zeyher
AGENT 3,200,490

METHOD OF FORMING OHMIC BONDS TO A GERMANIUM-COATED SILICON BODY WITH EUTECTIC ALLOY FORMING MATERIALS

Gerald K. Clymer, Sellersville, Pa., assignor to Philco Corporation, Philadelphia, Pa., a corporation of Delaware Filed Dec. 7, 1962, Ser. No. 243,013

2 Claims. (Cl. 29—473.1)

This invention relates to a method for bonding semiconductive material to a supporting substrate and more particularly to a novel and improved method for making ohmic connection to a body of silicon.

While the invention has broader applicability it will be described in relation to the mounting of a silicon transistor to a metallic surface.

Early prior art techniques for bonding silicon to a metallic substrate relied on low-melting alloys such as indium and tin solders. These materials were later replaced by gold, and preforms of eutectic-forming alloys of gold having substantially higher melting points. This trend was dictated by the requirement that semiconductor devices be capable of withstanding increasingly greater operating and storage temperatures. While this latter class of materials fulfilled the need for higher melting point solders they introduced a number of complexities.

To provide a satisfactory bond using gold it has heretofore been necessary to begin with a virgin silicon surface and to maintain the surface oxide free during bonding to prevent dewetting of the gold interface. One method of fulfilling this requirement has been to treat the silicon, prior to bonding, in a non-oxidizing atmosphere with a suitable chemical fluxing agent or mechanically to abrade the silicon surface to remove any latent oxide overlay. This step is followed by bonding in an inert atmosphere.

An alternative procedure, which avoids in part the need for extremely clean bonding surfaces, is to carry out bonding under pressure in an inert or non-oxidizing atmosphere while concurrently subjecting the parts to ultrasonic energy to produce relative transverse movements between the mating parts to scrub away objectionable oxides.

These techniques, while capable of producing a satisfactory bond either require the exercise of extreme care in initially providing a substantially oxide-free silicon surface or the employment of elaborate and complex procedures to prevent dewetting during bond fabrication. Moreover, these prior art methods are unpredictable and are frequently not productive of consistently acceptable results. The reduced yield which accordingly attends the use of such methods makes them commercially undesirable.

Another prior art approach for making ohmic or low-resistance connection to silicon, for example, that taught by Patent No. 3,025,439, is to electroplate or vacuum deposit an overlay of gold on surface portions to be joined and to interpose between the coated surfaces a preformed gold-germanium body of eutectic composition. While this latter method of bonding eliminates the problem of dewetting initiated by oxide formation at the gold-silicon interface—a factor which is thought to be the main cause of bond failure—it introduces the further complexities of adding an additional step to the manufacturing process and in requiring the use of a preform of precise eutectic composition.

It is accordingly a general object of the present invention to provide a novel and improved method of making low-resistance connection to silicon which overcomes the limitations of the prior art.

Another object of the invention is to provide a silicon-bonding process which is non-critical, simple and fully compatible with present day mass production techniques.

A still further object of the invention is the provision of a simplified method of making reliable ohmic connection to silicon which eliminates the need for a preform.

The foregoing and other objects and advantages of the invention will be more readily understood by reference to the following detailed description and drawing in which.

Figure 1:
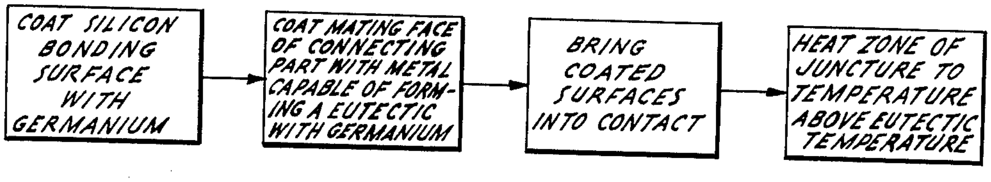
FIGURE 1 is a flow diagram showing the method steps of the invention and a preferred sequence of application.
Figure 2:
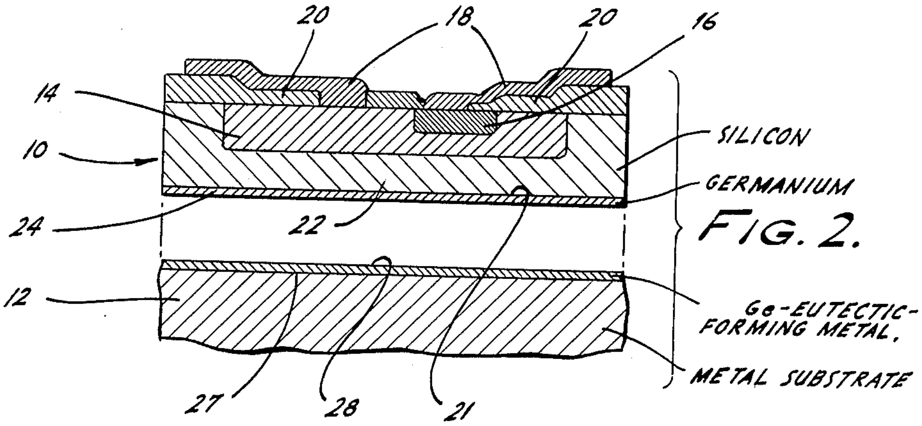
FIGURE 2 is a view, preliminary to bonding, of a silicon semiconductor device and a fragmental portion of a metallic substrate to which the device is to be bonded.

The preferred practice of the invention consists of coating the surface of the silicon to which connection is to be made with germanium, bringing that coated surface into contact with a substrate coated with gold and then heating the zone of juncture to a temperature above the gold-germanium eutectic but below the melting point of the constituents. It is desirable, although not essential, to bathe the parts, during bonding, in a non-oxidizing atmosphere, as would be provided, for example, by the use of a gas, such as nitrogen.

Substrate metal coatings found to be productive of the desired bond are gold and lead. Each of these metals when used in the practice of this invention will form an excellent ohmic connection between silicon and its supporting substrate.

The germanium, and gold or lead coating, can be laid down by any of a number of conventional techniques, as, for example, by electroplating or by vacuum deposition.

The germanium evidently serves to shield the silicon from oxidation during bonding, facilitates wetting of the silicon by the gold constituent of the system and contributes to the formation of consistently uniform and reliable bonds. Preferably the germanium deposited upon the silicon is doped with a trace quantity of material that induces in the germanium the same conductivity type as exhibited by the silicon which it overlies. For example, antimony is included where the bond is to N-type silicon and aluminum is added where the bond is to P-type silicon. The use of a dopant is well known in the prior art and forms no part of the instant invention.

To facilitate a better understanding of the process the preferred practice of the invention will be described in connection with the bonding of a silicon double-diffused planar transistor 10 to a metallic substrate 12 of Kovar.

The functional part of the semiconductor device, does not enter into, nor form any part of the invention and accordingly will be only briefly described. Transistors of the planar type are simultaneously fabricated by the hundreds from a single wafer of low resistivity silicon. Individual transistor chips 10, are then scribe-cut from the wafer after mass fabrication of the devices. The base 14, emitter 16, and contacts 18 are produced by conventional photomechanical techniques, the junctions being protected by a thermally grown oxide overlay.

After the functional part of the unit has been prepared the face 21 of the collector portion 22 is sized by being lapped or chemically etched, to the thickness required to produce the desired collector body resistance. This treatment is carried out in air and is effective to remove from this surface a substantial portion of the oxide overcoating produced during transistor fabrication. There remains a silicon surface which is nearly intrinsic, containing only atomic layers of oxide. One satisfactory etchant utilizable for this purpose is a solution of nitric, hydrofluoric and acetic acids in the proportion of 3–10–3, by volume, maintained at a temperature of approximately 20–25° C. during treatment. Following sizing, the wafer is placed in a vacuum chamber (not shown) and a coating 24 of intrinsic germanium, or germanium containing a suitable dopant is vacuum deposited onto the freshly etched silicon face 26 to a thickness of about 4500 angstroms. The thickness of germanium used is only critical in the sense that the eutectic melt formed by the gold and germanium is sufficient to produce a mechanically strong bond. As earlier mentioned if intrinsic germanium is deposited upon N-type silicon it is desirable to vacuum deposit over the germanium a thin film of antimony dopant to improve the nature of the ohmic connection. This phase of the process is carried out using an unheated silicon substrate, the only heating being that which incidently results from operation of an evaporation coil of the type commonly used in vapor depositing equipment. No alloying of the germanium with the silicon is required.

These steps are desirably carried out while the devices are an integral part of the larger wafer after which the wafer, containing hundreds of individual semiconductor devices, is removed from the vacuum chamber and scribe cut into separate transistor chips 10.

As a coordinate step in the process the part to which the silicon chip is to be connected is electroplated by conventional means with an overlay of gold. In the illustrated example the Kovar substrate surface 27 is electrolytically plated with gold 28 to a thickness of approximately one-tenth of a mil. The thickness of the gold, like the germanium, is only critical in the sense that there must be sufficient material present to produce the desired mechanical bond.

After the silicon surface 21 and the substrate surface 27 have been coated, they are placed in contact and the zone of juncture brought to a temperature above the gold-germanium eutectic temperature but lower than the melting temperature of either the silicon or gold. In those applications in which it is desirable, such as those in which connection to the base and emitter regions is provided by a gold silicon eutectic alloy, the bonding temperature may be reduced to a value less than that at which the gold-silicon eutectic undergoes liquifaction thereby preserving the integrity of the base and emitter connections. This step may be accomplished by heating the assembly by any of a number of commercially available techniques, such as by heating the assembly in an oven, or by the preferred practice of applying an electric current to the substrate by means of a pair of electrodes brought into contact with it and positioned on either side of the bond area. This technique is well recognized in the art and specific illustration and further elaboration are not thought to be required. By use of this latter method the Kovar substrate 12, acts as a resistive heating element on passage of current therethrough, to provide the required bonding temperature. A variable autotransformer may be provided in the electrical circuit to permit temperature adjustment. To eliminate the possibility of oxide formation this phase of the process is desirably carried out in an inert atmosphere. The process can, however, be satisfactorily carried out in a normal ambient atmosphere of air. One preferred technique is to bathe the area in nitrogen during bond formation by use of jets trained on the treatment zone.

Figure 3:
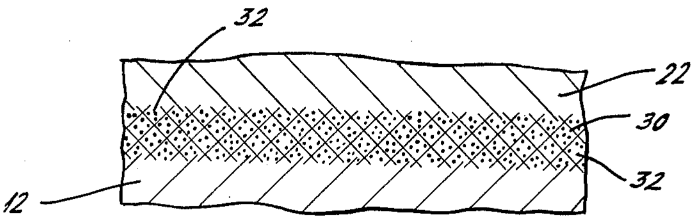
FIGURE 3 is an enlarged section of the resulting bond.

As mentioned previously, metallographic sections of the connection indicate that the bond is provided by a gold-silicon alloy system the gold completely absorbing the germanium overlay and causing partial dissolution of the silicon substrate. FIGURE 3 is an enlargement of the bond area graphically depicting the gold-silicon interface 30 having dispersed therein discrete germanium crystallites 32 which have precipitated out of solution during cooling. From this fact it has been deduced that the germanium serves to facilitate bonding by formation of a low melting point eutectic and serves in the further capacity of a shield to preserve the integrity of the underlying silicon surface by preventing its oxidation until consumation of the bond, a feature which additionally improves the storability of the device. Germanium has the further advantage that it forms an oxide much less readily than does silicon with the result that there is produced a much cleaner bond without the need for taking extreme care in its fabrication, which factors combine to provide a novel and improved method for making reliable ohmic connection to silicon.

While a preferred embodiment, illustrative of the method aspects of the invention has been depicted and described, it will be understood by those skilled in the art that the invention is susceptible of changes and modifications without departing from the essential concepts thereof, and that such changes and modifications are contemplated as come within the scope of the appended claims.

I claim:

1. The method of making ohmic connection to a body of silicon which comprises:
   (a) coating surface portions of said body, to which connection is to be made, with an overlay of germanium;
   (b) coating mating surface portions of a connecting member with a metal selected from the group consisting of gold and lead;
   (c) placing said coated surface portions in contact;
   (d) heating the zone of juncture to a temperature adjacent the temperature of the eutectic formed by said metal and said germanium; and
   (e) cooling said zone of juncture to permit formation of a mechanically strong ohmic connection between said body and said member.

2. The method of making ohmic connection to a body of silicon, which comprises:
   (a) vapor depositing onto surface portions of said silicon body a coating of germanium;
   (b) coating mating surface portions of a connecting member with a gold overlay;
   (c) placing said coated surface portions of said member and said body of silicon in contact;
   (d) heating the zone of juncture to a temperature adjacent the gold-germanium eutectic temperature; and
   (e) cooling said zone of juncture to permit formation of a mechanically strong ohmic connection between said body and said member.

3. The method of making ohmic connection to a body of silicon which comprises:
   (a) coating surface portions of said body with a metal selected from the group consisting of gold and lead;
   (b) coating mating surface portions of a connecting member with an overlay of germanium;
   (c) placing said coated surface portions in contact;
   (d) heating the zone of juncture to a temperature adjacent the temperature of the eutectic formed by said metal and said germanium; and
   (e) cooling said zone of juncture to permit formation of a mechanically strong ohmic connection between said body and said member.

References Cited by the Examiner

UNITED STATES PATENTS

| | | | |
|---|---|---|---|
| 2,555,001 | 5/51 | Ohl | 29—155.5 X |
| 2,763,822 | 9/56 | Frola et al. | |
| 2,960,008 | 9/59 | Boegehold et al. | 29—501 X |
| 2,922,092 | 1/60 | Gazzara et al. | 29—155.5 X |
| 2,971,251 | 2/61 | Willemse | 29—504 X |
| 3,128,545 | 4/64 | Cooper | 29—472.7 |

OTHER REFERENCES

Constitution of Binary Alloys—Hanson—McGraw-Hill 2nd Edition 1958, pgs. 23, 51, 97, 133, 206, 232, 768, 771, 774, 986 and 1106.

JOHN F. CAMPBELL, *Primary Examiner.*